US011112857B2

(12) United States Patent
Ohashi

(10) Patent No.: US 11,112,857 B2
(45) Date of Patent: Sep. 7, 2021

(54) INFORMATION PROCESSING APPARATUS, INFORMATION PROCESSING METHOD, AND PROGRAM

(71) Applicant: Sony Interactive Entertainment Inc., Tokyo (JP)

(72) Inventor: Yoshinori Ohashi, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 16/603,228

(22) PCT Filed: Apr. 18, 2018

(86) PCT No.: PCT/JP2018/016031
§ 371 (c)(1),
(2) Date: Oct. 5, 2019

(87) PCT Pub. No.: WO2018/198909
PCT Pub. Date: Nov. 1, 2018

(65) Prior Publication Data
US 2020/0033940 A1 Jan. 30, 2020

(30) Foreign Application Priority Data

Apr. 28, 2017 (JP) .............................. JP2017090170

(51) Int. Cl.
*G06F 3/01* (2006.01)
*G09G 5/38* (2006.01)

(52) U.S. Cl.
CPC .............. *G06F 3/011* (2013.01); *G09G 5/38* (2013.01); *G09G 2340/0464* (2013.01); *G09G 2354/00* (2013.01)

(58) Field of Classification Search
CPC .......... G06F 3/011; G06F 3/147; G06F 3/012; G09G 5/38; G09G 2340/0464;
(Continued)

(56) References Cited

U.S. PATENT DOCUMENTS 6,430,997 B1   8/2002 French
9,056,240 B2 * 6/2015 Carrell ............... A63C 17/1436
(Continued)

FOREIGN PATENT DOCUMENTS

JP   2015072687 A   4/2015
JP   2016532178 A   10/2016
(Continued)

OTHER PUBLICATIONS

Notice of Reasons for Refusal for corresponding Application JP 2019514428, 10 pages, dated May 14, 2020.
(Continued)

*Primary Examiner* — Grant Sitta
(74) *Attorney, Agent, or Firm* — Matthew B. Dernier, Esq.

(57) ABSTRACT

Provided is an information processing apparatus which detects an amount of movement in a real space of a target point concerning a predetermined target in the real space, computes a position in a virtual space of a virtual object by using information about the detected amount of movement, disposes the virtual object at the computed position, and sets information about the virtual space.

9 Claims, 3 Drawing Sheets

(58) Field of Classification Search
CPC .... G09G 2354/00; G09G 3/003; G06T 19/00; G02B 27/02
See application file for complete search history.

(56) References Cited

U.S. PATENT DOCUMENTS

| | | | |
|---|---|---|---|
| 9,239,616 B1* | 1/2016 | Carrell | A63C 17/1436 |
| 9,329,681 B2* | 5/2016 | Goetgeluk | G06F 3/011 |
| 9,665,170 B1* | 5/2017 | Ross | G06F 3/011 |
| 9,908,048 B2 | 3/2018 | Osman | |
| 10,261,576 B2 | 4/2019 | Alaniz | |
| 10,310,595 B2 | 6/2019 | Tatsuta | |
| 10,398,519 B2* | 9/2019 | Kim | A61B 34/76 |
| 10,810,800 B2* | 10/2020 | Ahn | G06F 3/013 |
| 2011/0009241 A1* | 1/2011 | Lane | A63B 24/0087 482/8 |
| 2011/0184225 A1* | 7/2011 | Whitall | A63B 24/0003 600/28 |
| 2012/0127169 A1* | 5/2012 | Barcay | G06T 15/20 345/419 |
| 2013/0188862 A1* | 7/2013 | Lievens | G06T 19/20 382/154 |
| 2014/0087922 A1* | 3/2014 | Bayerlein | A63B 21/00181 482/54 |
| 2014/0213417 A1* | 7/2014 | Kuntz | A63B 24/0087 482/8 |
| 2014/0364212 A1 | 12/2014 | Osman | |
| 2015/0097860 A1 | 4/2015 | Alaniz | |
| 2016/0217614 A1* | 7/2016 | Kraver | G06T 19/006 |
| 2017/0083084 A1 | 3/2017 | Tatsuta | |
| 2017/0109937 A1* | 4/2017 | Koga | G06F 3/011 |
| 2017/0139473 A1 | 5/2017 | Alaniz | |
| 2017/0287225 A1* | 10/2017 | Powderly | G06F 3/0346 |
| 2018/0357472 A1* | 12/2018 | Dreessen | G06T 11/00 |
| 2020/0234496 A1* | 7/2020 | de Belle | A63B 71/0622 |
| 2020/0293106 A1* | 9/2020 | Lusinchi | G06F 3/011 |

FOREIGN PATENT DOCUMENTS

| | | |
|---|---|---|
| WO | 2011067469 A1 | 6/2011 |
| WO | 2014197337 A1 | 5/2014 |
| WO | 2016002318 A1 | 1/2016 |
| WO | 2016028531 A1 | 2/2016 |
| WO | 2016065401 A1 | 5/2016 |

OTHER PUBLICATIONS

International Search Report for corresponding Application PCT/JP2018/016031, 4 pages, dated May 22, 2018.
International Preliminary Report on Patentability and Written Opinion for corresponding Application PCT/JP2018/016031, 16 pages, dated Nov. 7, 2019.
Extended European Search Report for corresponding EP Application 18789823.4, 10 pages, dated Dec. 9, 2020.

* cited by examiner

INFORMATION PROCESSING APPARATUS, INFORMATION PROCESSING METHOD, AND PROGRAM

TECHNICAL FIELD

The present invention relates to an information processing apparatus, an information processing method, and a program.

BACKGROUND ART

In recent years, a device for displaying an image in a virtual three-dimensional space (hereinafter simply referred to as the virtual space), such as a head-mounted display, is widely used. Further, developed is a technique for offering a user an experience of determining a motion of an object in the virtual space in accordance with a motion of the user for the purpose of controlling a character by moving as the character in the virtual space.

[Summary] [Technical Problem]

However, when the above conventional technique is used, a movement of the user and a motion of a hand of the user are both reflected in a motion of the object in the virtual space as an amount of movement at the same rate. Therefore, only limited sensations can be presented to the user.

The present invention has been made in view of the above circumstances. An object of the present invention is to provide an information processing apparatus, an information processing method, and a program that are capable of presenting a wider variety of experiences.

Solution to Problem

In order to solve the above problem of the example of the conventional technique, according to the present invention, there is provided an information processing apparatus including detection means detecting an amount of movement in a real space of a target point concerning a predetermined target in the real space; and setup means setting information about a virtual space by computing a position in the virtual space of a virtual object corresponding to the predetermined target through use of information about the detected amount of movement of the target point, disposing the virtual object at the computed position in the virtual space, and setting the information about the virtual space, in which the information about the virtual space is used to perform a process of displaying an object in the virtual space to a user.

Advantageous Effect of Invention

The present invention presents a wider variety of experiences to the user.

DESCRIPTION OF EMBODIMENT

Figure 1:
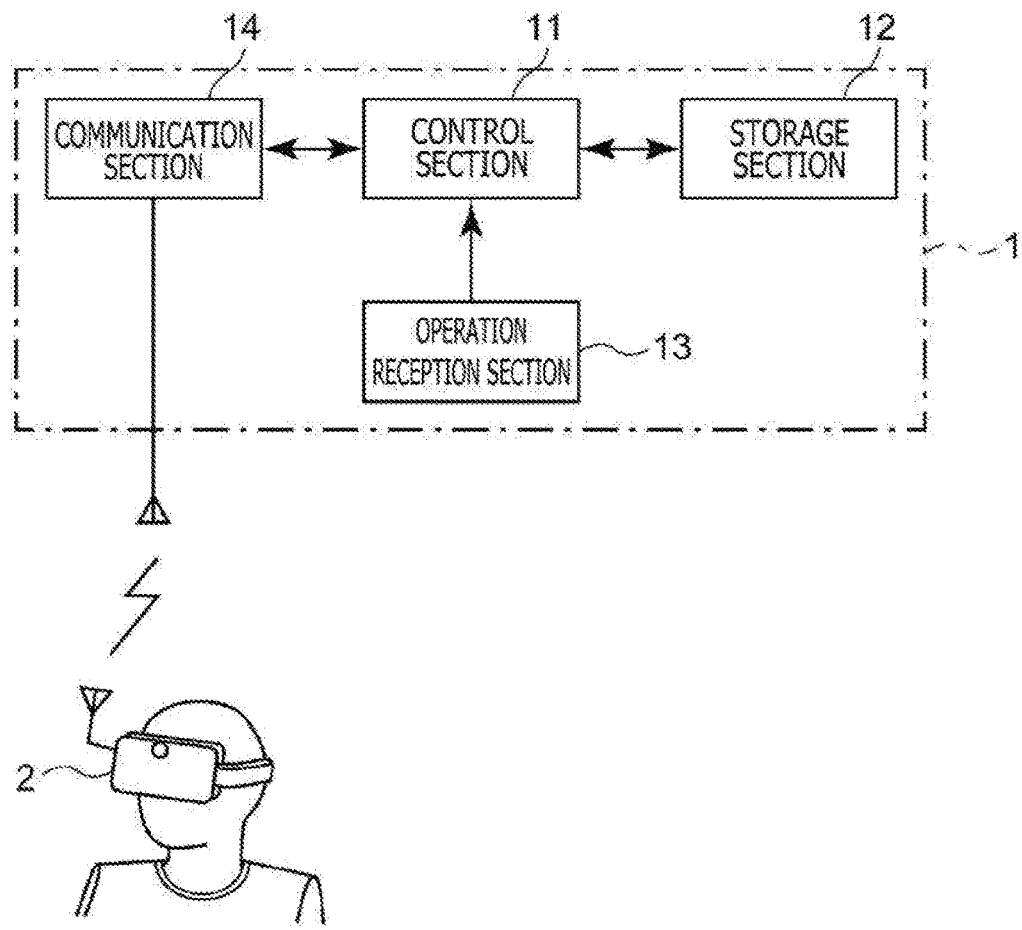
FIG. 1 is a block diagram illustrating an exemplary configuration of an information processing apparatus according to an embodiment of the present invention.

An embodiment of the present invention will now be described with reference to the accompanying drawings. As illustrated in FIG. 1, an information processing apparatus 1 according to the embodiment of the present invention is, for example, a server computer that includes a control section 11, a storage section 12, an operation reception section 13, and a communication section 14. Further, the information processing apparatus 1 is communicatively connected to a display apparatus 2 such as a head-mounted display (HMD) that is worn on the head of a user.

Figure 2:
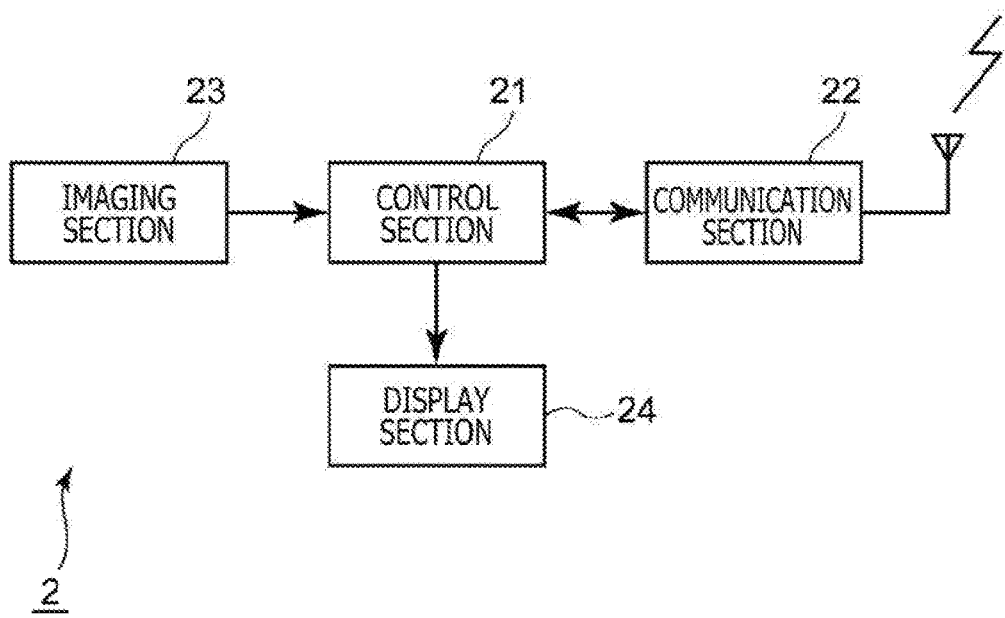
FIG. 2 is a configuration block diagram illustrating an example of a display apparatus that is to be connected to the information processing apparatus according to the embodiment of the present invention.

In the present embodiment, the display apparatus 2 worn on the head of the user is, for example, a display device worn on the head of the user. As illustrated in FIG. 2, the display apparatus 2 includes a control section 21, a communication section 22, an imaging section 23, and a display section 24. In the example of FIG. 2, the control section 21 of the display apparatus 2 is a program control device such as a microcomputer. The control section 21 operates in accordance with a program stored, for example, in a built-in storage section such as a memory (not depicted), causes the display section 24 to display a video based on information inputted from the information processing apparatus 1 through the communication section 22, and allows the user to view the displayed image.

The communication section 22 is communicatively connected to the information processing apparatus 1 in a wired or a wireless manner. The communication section 22 transmits image data captured by the later-described imaging section 23 to the information processing apparatus 1. Further, the communication section 22 outputs, to the control section 21, information transmitted from the information processing apparatus 1 to the display apparatus 2.

The imaging section 23 is, for example, a camera. The imaging section 23 repeatedly captures an image of a real space in a predetermined field of view forward of the user (forward of the head of the user) and transmits captured image data thus obtained to the information processing apparatus 1 through the communication section 22.

The display section 24 displays a video for a user's left eye in front of the user's left eye and displays a video for a user's right eye in front of the user's right eye. The display section 24 includes a display element such as an organic electro-luminescence (EL) display panel or a liquid-crystal display panel. The display element displays a video in accordance with an instruction inputted from the control section 21. The display element may be a single display element for displaying a left-eye video and a right-eye video side by side in a row or may be a pair of display elements for displaying a left-eye video and a right-eye video independently of each other. The present embodiment assumes that the display apparatus 2 is a non-transparent display apparatus that does not allow the user to view the outside world.

The control section 11 of the information processing apparatus 1 is a program control device such as a central processing unit (CPU). The control section 11 executes a program stored in the storage section 12. In the present embodiment, the control section 11 acquires information about the position of the user in the real space, and uses the position, which is indicated by the acquired information, as a real space reference position to acquire relative position coordinates, with respect to the real space reference position, of a predetermined target moving together with the user. Further, the control section 11 computes a position in a virtual space of a virtual object corresponding to the user and a position in the virtual space of a virtual object corresponding to the predetermined target. This computation is performed by using the acquired information about the position of the user and the relative position coordinates. The control section 11 then performs a process of disposing the virtual objects at the computed positions in the virtual space and setting information about the virtual space. Moreover, the control section 11 generates image data by rendering a virtual object in the field of view of a virtual camera disposed at a predetermined position in the virtual space. The control section 11 outputs the generated image data to the display apparatus 2 of the user through the communication section 14. The operations of the control section 11 will be described in detail later.

The storage section 12 is, for example, a memory device such as a random access memory (RAM) or a disk device. The storage section 12 stores a program that is to be executed by the control section 11. Further, the storage section 12 operates as a work memory for the control section 11 to store data that is to be used by the control section 11 during program execution. The program may be supplied on a computer-readable, non-transitory recording medium and stored in the storage section 12.

The operation reception section 13 receives a user's instruction operation from an operation device (not depicted) in a wired or wireless manner. The operation device is, for example, a controller for a home gaming machine. The operation reception section 13 outputs, to the control section 11, information indicative of an instruction operation that is performed by the user with respect to the operation device. In the present embodiment, the user does not always need to operate the operation device. For example, the operation reception section 13 may capture an image of the user, detect the motion of a user's hand or the like, and output information about the motion of the user's hand or the like to the control section 11 as information indicative of the user's operation.

The communication section 14 is communicatively connected to the user's display apparatus 2 in a wired or wireless manner. The communication section 14 receives image data outputted from the display apparatus 2 and transmits the received image data to the control section 11. Further, the communication section 14 receives information including image data to be transmitted from the control section 11 to the display apparatus 2, and outputs the received information to the display apparatus 2.

Figure 3:
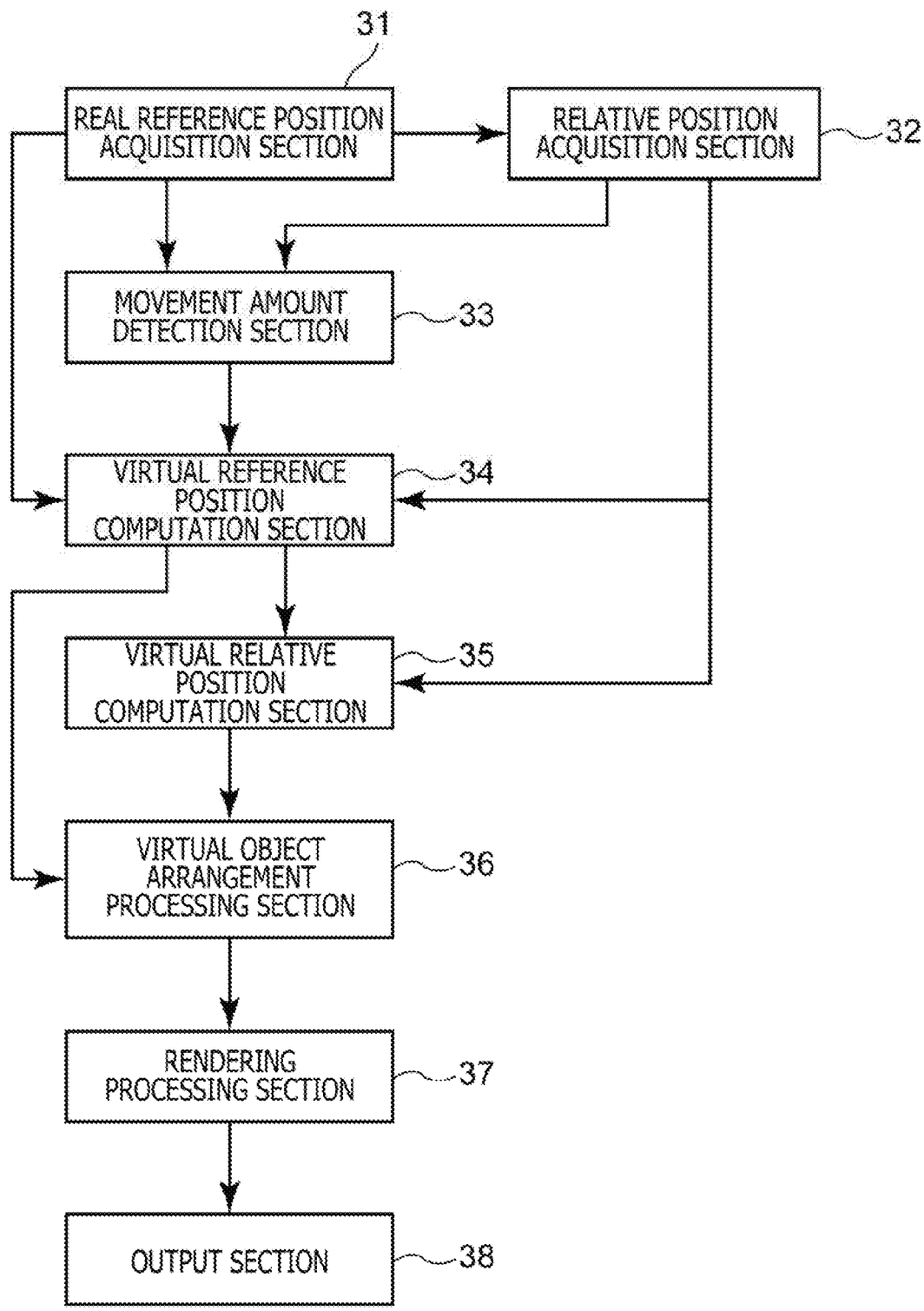
FIG. 3 is a functional block diagram illustrating an example of the information processing apparatus according to the embodiment of the present invention.

The operations of the control section 11 of the information processing apparatus 1 will now be described. As illustrated in FIG. 3, the control section 11 according to the present embodiment functionally includes a real reference position acquisition section 31, a relative position acquisition section 32, a movement amount detection section 33, a virtual reference position computation section 34, a virtual relative position computation section 35, a virtual object arrangement processing section 36, a rendering processing section 37, and an output section 38, by way of example.

The real reference position acquisition section 31 acquires information about the position and the posture of a predetermined user's attention part in the real space. More specifically, the real reference position acquisition section 31 acquires, as real reference position information, the information about the position of the head as the user's attention part in the real space in accordance with image data that is captured by the imaging section 23 and outputted from the display apparatus 2. A process of acquiring information by estimating a position and an orientation based on image data as described above is not described in detail here because it is widely known as the method, for example, of odometry or simultaneous localization and mapping (SLAM).

The real reference position acquisition section 31 acquires, as the real reference position information, for example, information P (xh, yh, zh) about coordinates of the user's head in the real space (coordinate values in a world coordinate system in the real space with respect to the origin represented by a predetermined reference point in the real space) and information about the orientation of the user's head in the real space.

In the present example, the real reference position acquisition section 31 corresponds to first acquisition means according to the present invention. Here, the world coordinate system in the real space is a Cartesian coordinate system where the XY plane represents a floor plane and the Z-axis represents the height from the floor plane within the range of user movement in the real space (the floor plane is assumed to be a flat surface). Further, in this Cartesian coordinate system, the X-axis direction is a predetermined axial direction (e.g., the east-west direction) virtually set in the floor plane, and the Y-axis direction is an axial direction in the floor plane that is orthogonal to the X-axis direction (the Y-axis direction is the north-south direction when the X-axis direction is the east-west direction).

The relative position acquisition section 32 uses the real reference position information acquired by the real reference position acquisition section 31 to acquire the relative position coordinates, with respect to the real space reference position, of a point (a target point) concerning the predetermined target moving together with the user. An example of the present invention assumes that the predetermined target is a predetermined part of a body of the user (excluding a part (attention part) identified by the real reference position information (the head in the present example)). More specifically, the target point concerning the predetermined target may be any point that moves together with the predetermined target. For example, the target point may be set on the predetermined target. The following description assumes that the target point is the center of the feet of the user. In the following example, it is assumed, for example, that a sensor for detecting the height from the floor plane (a Z-axis coordinate value in the world coordinate system in the real space) is attached to the feet of the user. It is assumed that the control section 11 of the information processing apparatus 1 acquires information Q (xf, yf, zf) about the central position of the feet of the user (hereinafter simply referred to as the feet position) from the sensor.

The relative position acquisition section 32 determines a relative position Q' (xf–xh, yf–yh, zf–zh) between coordinates P (xh, yh, zh) of the user's head in the real space, which are indicated by the real reference position information, and the information Q (xf, yf, zf) about the feet position of the user. The relative position acquisition section 32 corresponds to second acquisition means according to the present invention.

The movement amount detection section 33 determines an amount of movement of the target point on the predetermined target from a predetermined initial position in accordance with the information acquired by the relative position acquisition section 32. By way of example, the predetermined initial position is regarded as the position zf0 indicative of a predetermined height from the floor plane on which the feet are positioned, and the amount of movement is computed as the distance $\Delta Q = zf - zf0$ between the position $zf0$ indicative of the predetermined height and the position indicative of the current height $zf$ of the feet from the floor plane, which is indicated by the information Q (xf, yf, zf) about the user's feet position acquired by the relative position acquisition section 32.

The virtual reference position computation section 34 receives the real reference position information P, which is inputted from the real reference position acquisition section 31. Further, the virtual reference position computation section 34 receives information about the relative position Q' from the relative position acquisition section 32. Moreover, the virtual reference position computation section 34 receives the amount of movement $\Delta Q$, which is inputted from the movement amount detection section 33.

Based on the above pieces of inputted information, the virtual reference position computation section 34 computes the reference position of the user in the virtual space. In the present example of the present embodiment, the virtual reference position computation section 34 acquires the position coordinates Q (xf, yf, zf) of the user's feet in the world coordinate system within the real space by adding the real reference position information P to the relative position Q' acquired by the relative position acquisition section 32. The virtual reference position computation section 34 computes provisional values of position coordinates in the virtual space corresponding to the position coordinates Q (coordinate values in the world coordinate system ($\xi$, $\eta$, $\zeta$ Cartesian coordinate system) within the virtual space) as indicated below:

$$\xi f = \alpha \cdot xf$$

$$\eta f = \alpha \cdot yf$$

$$\zeta f = \alpha \cdot zf$$

where $\alpha$ is the coordinate system size ratio between the virtual space and the real space, and $\alpha$ may be equal to 1.

Further, the virtual reference position computation section 34 determines the coordinate values of the user's feet in the world coordinate system within the virtual space by adding a value based on the amount of movement to the above-determined provisional position coordinate values. In the present example of the present embodiment, the amount of movement is limited to the Z-axis ($\zeta$-axis in the virtual space) direction (the height direction from the floor plane). Therefore, the virtual reference position computation section 34 adds the value of $\zeta$-axis direction to a value obtained by multiplying the amount of movement by a predetermined coefficient (n). That is, the information about the position of a virtual object corresponding to the user's feet is as indicated below:

$$\xi f = \alpha \cdot xf$$

$$\eta f = \alpha \cdot yf$$

$$\zeta f = \alpha \cdot zf + n \cdot \Delta Q = \alpha \cdot zf + n \cdot zf - n \cdot zf0$$

The virtual reference position computation section 34 regards the coordinate values indicated by the information about the position computed above as the coordinate values of the virtual reference position indicative of the virtual object position.

The virtual relative position computation section 35 determines the position coordinates of the user's head in the virtual space (a part of the user's body at a real reference position in the real space). More specifically, based on the feet regarded as the target point concerning the predetermined target, the virtual relative position computation section 35 determines the relative position coordinates in the virtual space with respect to the head, which is a part identified by the real reference position information. Here, the virtual relative position computation section 35 inverts the sign of the information about the relative position Q' outputted from the relative position acquisition section 32. The virtual relative position computation section 35 then determines the position coordinates of the user's head in the virtual space (the part of the user's body at the real reference position in the real space) by adding the above-determined relative position coordinates to the coordinate values of the virtual reference position computed by the virtual reference position computation section 34 as indicated below:

$$\xi h = \alpha \cdot xf - \alpha \cdot (xf - xh) = \alpha \cdot xh$$

$$\eta h = \alpha \cdot yf - \alpha \cdot (yf - yh) = \alpha \cdot yh$$

$$\zeta h = \alpha \cdot zf + n \cdot zf - n \cdot zf0 - \alpha \cdot (zf - zh) = \alpha \cdot zh + n \cdot zf - n \cdot zf0$$

That is, the position of a first part serving as a reference in the real space and the position of a target moving together with the user (may be a second part of the user's body), which is determined as the relative position with respect to the first part, are acquired, and then, as regards the virtual space, a reference position in the virtual space is determined based on the position of the target moving together with the user, and the position of the first part in the virtual space is determined as the relative position with respect to the reference position. In this instance, the amount of movement of the second part is multiplied by n.

The virtual object arrangement processing section 36 disposes, at the coordinates of the virtual reference position computed by the virtual reference position computation section 34, the virtual object corresponding to the predetermined target moving together with the user in the real space. The present example assumes that the predetermined target is the user's feet. The virtual object arrangement processing section 36 sets the coordinates of the virtual reference position computed by the virtual reference position computation section 34 as the position of the object corresponding to the user's feet (e.g., an object corresponding to the feet of an avatar in a case where the avatar of the user is a virtual object).

Further, the virtual object arrangement processing section 36 performs setup such that virtual objects to be disposed in the virtual space are disposed at positions determined respectively by predetermined methods (e.g., at positions predetermined or determined by computation). Furthermore, the objects may include an object corresponding to the floor plane. In such an instance, the virtual object arrangement processing section 36 performs setup such that a virtual object representing the floor plane is additionally disposed while a position (a plane expressed by the equation $\zeta = zf0$) corresponding to the floor plane in the virtual space is regarded as the virtual floor plane.

Moreover, the virtual object arrangement processing section 36 disposes, at a position in the virtual space that is computed by the virtual relative position computation section 35, a virtual object corresponding to a part of the user's body placed at the real reference position in the real space. In the present example, the part of the user's body placed at the real reference position is the user's head. Therefore, the virtual object arrangement processing section 36 sets, for example, as the position of the object corresponding to the head of the avatar, the position in the virtual space that is computed by the virtual relative position computation section 35.

As the above-described setup is performed, the amount of movement in the virtual space is equal to a value obtained by multiplying the amount of movement in the real space by the predetermined coefficient (n). That is, in the present embodiment, when the amount of movement of the user in the real space is r, the position of the user is determined in such a manner as if it is moved by n·r in the virtual space. Further, the size of the head or other part of the user's body that follows the position of the target corresponding to the reference position is not multiplied by the predetermined coefficient because it is disposed at a position corresponding to an actual size with respect to the reference position. Therefore, although the size of an avatar corresponding to the head or other part of the user's body is not different from its size in the real space, staging effects can be produced to create a situation where the amount of avatar movement in the virtual space seems to be equal to a value obtained by multiplying the amount of movement in the real space by the predetermined coefficient.

The virtual reference position computation section 34, the virtual relative position computation section 35, and the virtual object arrangement processing section 36, which are described above, implement setup means according to the present invention.

The rendering processing section 37 sets a virtual camera in the virtual space set by the virtual reference position computation section 34, the virtual relative position computation section 35, and the virtual object arrangement processing section 36. The field of view of the virtual camera is forward of the user's head from a position corresponding to the user's head. The rendering processing section 37 performs rendering to generate image data of an object in the virtual space within the field of view from the virtual camera set as described above. This process is not described in detail here because it can be performed by using a well-known method of performing rendering to generate image data in a virtual three-dimensional space. The output section 38 transmits the image data, which is generated by the rendering processing section 37, to the display apparatus 2 worn by the user.

In the foregoing examples, the position of the user's head is regarded as the reference position in the real space (regarded as the real reference position), and the information about the coordinates of the user's feet is acquired as the information about the relative position. However, in the present embodiment, in order to detect the posture of the user, the coordinate information about more parts of the user's body in the real space may be acquired as the information about the relative position with respect to the real reference position. For example, the relative position acquisition section 32 according to the present embodiment may use the real reference position information acquired by the real reference position acquisition section 31 to detect coordinate information about each of the neck, left and right shoulders, left and right hands, abdomen, left and right hip joints, and left and right knees of the user in the real space as relative coordinate information with respect to coordinates in the real space indicated by the real reference position information.

The detection of the above coordinate information may be performed by a sensor attached to each part of the user's body or by capturing an image of the user's body from the outside and estimating the coordinates by bone model matching, for example. These processes are also well known and are not described in detail here.

In the above exemplary case, the virtual reference position computation section 34 receives the information about the relative position Q' of each part of the user's body, which is inputted from the relative position acquisition section 32. The virtual reference position computation section 34 then selects the information about the relative position Q' of one of the parts of the user's body, which is inputted from the relative position acquisition section 32, and determines the coordinates of the virtual reference position by using the relative position Q' indicated by the selected information, the amount of movement ΔQ, and the real reference position information P.

Then, the virtual relative position computation section 35 determines not only the position coordinates of the user's head (a part of the user's body placed at the real reference position in the real space) in the virtual space, but also the position coordinates of each part of the user's body in the virtual space that is not selected by the virtual reference position computation section 34 and corresponds to the information about the relative position Q' of each part of the user's body. More specifically, based on the information about the virtual reference position and the information about the relative position, the virtual relative position computation section 35 determines the position coordinates ($\xi h$, $\eta h$, $\zeta h$) of the user's head (a part of the user's body placed at the real reference position in the real space) in the virtual space. Subsequently, the virtual relative position computation section 35 determines the information about the relative position Q' of each part of the user's body in the virtual space that is not selected by the virtual reference position computation section 34 and corresponds to the information about the relative position Q' of each part of the user's body. The virtual relative position computation section 35 then determines the position coordinates of each part of the user's body in the virtual space by adding the determined information about the relative position Q' to the position coordinates of a part of the user's body in the virtual space that is placed at the real reference position in the real space.

As a consequence, the information processing apparatus 1 according to the present embodiment acquires position information about each part of the user's body that is used to express the posture of the avatar of the user in the virtual space. In this manner, it is possible to set the position of an object corresponding to each part of the user's body, for example, the position of the avatar of the user or other object in the virtual space. That is, the aspect of the posture of a virtual object in the virtual space can be set in accordance with the posture of the user. The information about the posture of the user may be not only reflected in the posture of an avatar in the virtual space, but also used to set the other aspects such as the color of an object corresponding to the user in the virtual space.

The information processing apparatus 1 according to the present embodiment is basically configured as described above, and operates as described below. The following example describes an example where the user jumps on the floor plane. The information processing apparatus 1 according to the present embodiment repeatedly executes a process illustrated in FIG. 4 at predetermined time intervals (e.g., at ⅓₀-second intervals or at intervals corresponding to the frame rate of the display apparatus 2). In the illustrated process, first of all, the position of the user's head in the real space is acquired as the real reference position (step S1). In the present example, the position of the user's head in the real space that is acquired by the information processing apparatus 1 during a period during which the user jumps from an initial position, lands on the floor plane, and returns to a previous posture is as described below. The position of the user's head in an initial state where the user is upright is:

$$(xh0, yh0, zh0)$$

The position in a state where the knees of the user are bended is:

$$(xh0, yh0, zh1)$$

where zh1<zh0 The position in a state where the user jumps is:

$$(xh0, yh0, zh2)$$

where zh2>zh0
Subsequently, when the user lands and returns to the previous posture, the position of the user's head that is acquired by the information processing apparatus 1 returns to the previous upright state as indicated below:

$$(xh0, yh0, zh0)$$

Further, the information processing apparatus 1 acquires the relative position of the user's feet with respect to the real reference position (step S2). In this instance, during a period during which the user in an upright position bends his/her knees, the position of the user's feet that is acquired by the information processing apparatus 1 remains unchanged from an initial position indicated below:

$$(xf0, yf0, zf0)$$

However, when the user jumps, the feet position leaves the floor plane as indicated below:

$$(xf0, yf0, zf1)$$

where zf1>zf0
Subsequently, when the user reverts to the previous upright state (lands), the user returns to the initial position indicated below:

$$(xf0, yf0, zf0)$$

Consequently, the information about the relative position of the feet with respect to the position of the head (real reference position) that is acquired by the information processing apparatus 1 in the initial state where the user is upright is:

$$(xf0-xh0, yf0-yh0, zf0-zh0)$$

When the user bends his/her knees, the information about the relative position is:

$$(xf0-xh0, yf0-yh0, zf0-zh1)$$

where zh1<zh0
When the user jumps, the information about the relative position is:

$$(xf0-xh0, yf0-yh0, zf1-zh2)$$

where zh2>zh0 and zf1>zf0
Subsequently, when the user lands and returns to the previous posture, the relative position of the feet with respect to the position of the head (real reference position) that is acquired by the information processing apparatus 1 returns to the previous upright state as indicated below:

$$(xf0-xh0, yf0-yh0, zf0-zh0)$$

Further, the information processing apparatus 1 detects the movement amount of the feet (step S3). In the present example, during a period during which the user in an upright position bends his/her knees, the information about the movement amount of the feet that is detected by the information processing apparatus 1 is:

$$zf0-zf0=0$$

When the user jumps, the feet position zf1>zf0 changes such that the information about the movement amount of the feet is:

$$zf1-zf0>0$$

Subsequently, when the user reverts to the previous upright state (lands), the information about the movement amount of the feet returns to the initial value as indicated below:

$$zf0-zf0=0$$

Based on the above-mentioned real reference position information, relative position Q', and the information about the movement amount ΔQ, the information processing apparatus 1 computes the reference position of the user in the virtual space (step S4).

More specifically, the information processing apparatus 1 acquires the position coordinates Q of the user's feet in the world coordinate system within the real space by adding the relative position Q' to the real reference position information P. The information processing apparatus 1 then computes provisional values of position coordinates in the virtual space that correspond to the position coordinates Q (coordinate values of the world coordinate system ($\xi$, $\eta$, $\zeta$ Cartesian coordinate system) within the virtual space) (step S5). Further, the information processing apparatus 1 adds the provisional values to a value obtained by multiplying the movement amount by the predetermined coefficient (n) (step S6).

In the present example, the information about the position of a virtual object corresponding to the user's feet in the initial state where the user is upright is:

$$(\alpha \cdot xf0, \alpha \cdot yf0, \alpha \cdot zf0)$$

Even when the user bends his/her knees (the feet position remains unchanged), the above information remains unchanged.

When the user jumps, the information is:

$$(\alpha \cdot xf0, \alpha \cdot yf0, \alpha \cdot zf0 + n \cdot (zf1-zf0))$$

where zf1>zf0
Subsequently, when the user lands and returns to the previous posture, the information about the position of a virtual object corresponding to the user's feet that is computed by the information processing apparatus 1 returns to the previous upright state as indicated below:

$$(\alpha \cdot xf0, \alpha \cdot yf0, \alpha \cdot zf0)$$

The information processing apparatus 1 regards the coordinate values determined in step S6 as the coordinate values of the virtual reference position, and determines the position coordinates in the virtual space that correspond to the user's attention part placed at the real reference position in the real space (step S7). More specifically, the information processing apparatus 1 inverts the sign of the relative position of the feet with respect to the real reference position (the information acquired in step S2). Further, the information processing apparatus 1 acquires the information about the relative position with respect to the real reference position as viewed from the feet position (values in the world coordinate system within the virtual space) by performing conversion to a virtual space scale. The information processing apparatus 1 adds the information about the virtual reference position determined in step S6 to the above acquired information about the relative position to determine the position coordinates in the virtual space that correspond to the user's attention part placed at the real reference position in the real space.

Consequently, in the initial state where the user is upright, the above information is:

$$(\alpha \cdot xh0-\alpha \cdot xf0+\alpha \cdot xf0, \alpha \cdot yh0-\alpha \cdot yf0+\alpha \cdot yf0, \alpha \cdot zh0-\alpha \cdot zf0+\alpha \cdot zf0)$$

That is:

$$(\alpha \cdot xh0, \alpha \cdot yh0, \alpha \cdot zh0)$$

When the user bends his/her knees, the above information is:

$$(\alpha \cdot xh0-\alpha \cdot xf0+\alpha \cdot xf0, \alpha \cdot yh0-\alpha \cdot yf0+\alpha \cdot yf0, \alpha \cdot zh1-\alpha \cdot zf0+\alpha \cdot zf0)$$

That is:

$$(\alpha \cdot xh0, \alpha \cdot yh0, \alpha \cdot zh1)$$

where zh1<zh0

When the user jumps, the above information is:

$$(\alpha \cdot xh0-\alpha \cdot xf0+\alpha \cdot xf0, \alpha \cdot yh0-\alpha \cdot yf0+\alpha \cdot yf0, \alpha \cdot zh0-\alpha \cdot zf0+\alpha \cdot zf0+n \cdot (zf1-zf0))$$

That is:

$$(\alpha \cdot xh0, \alpha \cdot yh0, \alpha \cdot zh0+n \cdot (zf1-zf0))$$

where zf1>zf0

That is, when the user jumps in the above instance, such a jump is handled in the virtual space as if the distance between the head and the floor plane is n times the amount of jump in the real space. However, the distance between the head and the feet is the difference between ($\alpha \cdot xf0$, $\alpha \cdot yf0$, $\alpha \cdot zf0+n \cdot (zf1-zf0)$) and ($\alpha \cdot xh0$, $\alpha \cdot yh0$, $\alpha \cdot zh0+n \cdot (zf1-zf0)$), and thus, ($\alpha \cdot xh0-\alpha \cdot xf0$, $\alpha \cdot yh0-\alpha \cdot yf0$, $\alpha \cdot zh0-\alpha \cdot zf0$). This state is the same as the initial state.

Subsequently, when the user lands and returns to the previous posture, the position coordinates in the virtual space that correspond to the user's attention part at the real reference position in the real space, which is determined by the information processing apparatus 1, return to the previous upright state as indicated below:

$$(\alpha \cdot xh0, \alpha \cdot yh0, \alpha \cdot zh0)$$

When disposing an avatar corresponding to the user (a virtual object), the information processing apparatus 1 disposes the virtual object corresponding to the feet of the avatar, that is, the predetermined target (the user's feet in the present example), which moves together with the user in the real space, at the coordinates of the virtual reference position computed in step S6. Further, the information processing apparatus 1 sets the position determined in step S7 as the head of the avatar (step S8).

Next, the information processing apparatus 1 renders an image in the virtual space within a predetermined field of view forward of the user's head from the position of the user's head, and transmits the rendered image data to the display apparatus 2 worn by the user (step S9).

In the present example, when the user jumps in the real space to a height of zf1–zf0 from the floor plane, the virtual camera in the virtual space is set to a height n times the height of zf1–zf0 from the floor plane in the virtual space, that is, set to a height of n·(zf1–zf0), and the image data in the field of view of the virtual camera is presented to the user.

[Adjustment of Fall Velocity] In the above-described example, when the user jumps in the real space, the position of the user's head reached by such a jump in the real place is handled as if the position of the user's head reached in the virtual space is n times higher than the amount of jumping in the real space. Meanwhile, when the user falls, it is displayed as if the velocity of such a fall is n times the fall velocity in the real space. Therefore, the information processing apparatus 1 may be able to set the fall velocity. By way of example, the information processing apparatus 1 may accept the following settings and execute a relevant process:

Falls at n times the velocity (as mentioned above).
Falls at a fixed velocity.
Coincides with actual gravitational acceleration.
Falls at a specified acceleration.
Does not fall.
Rises.

Figure 4:
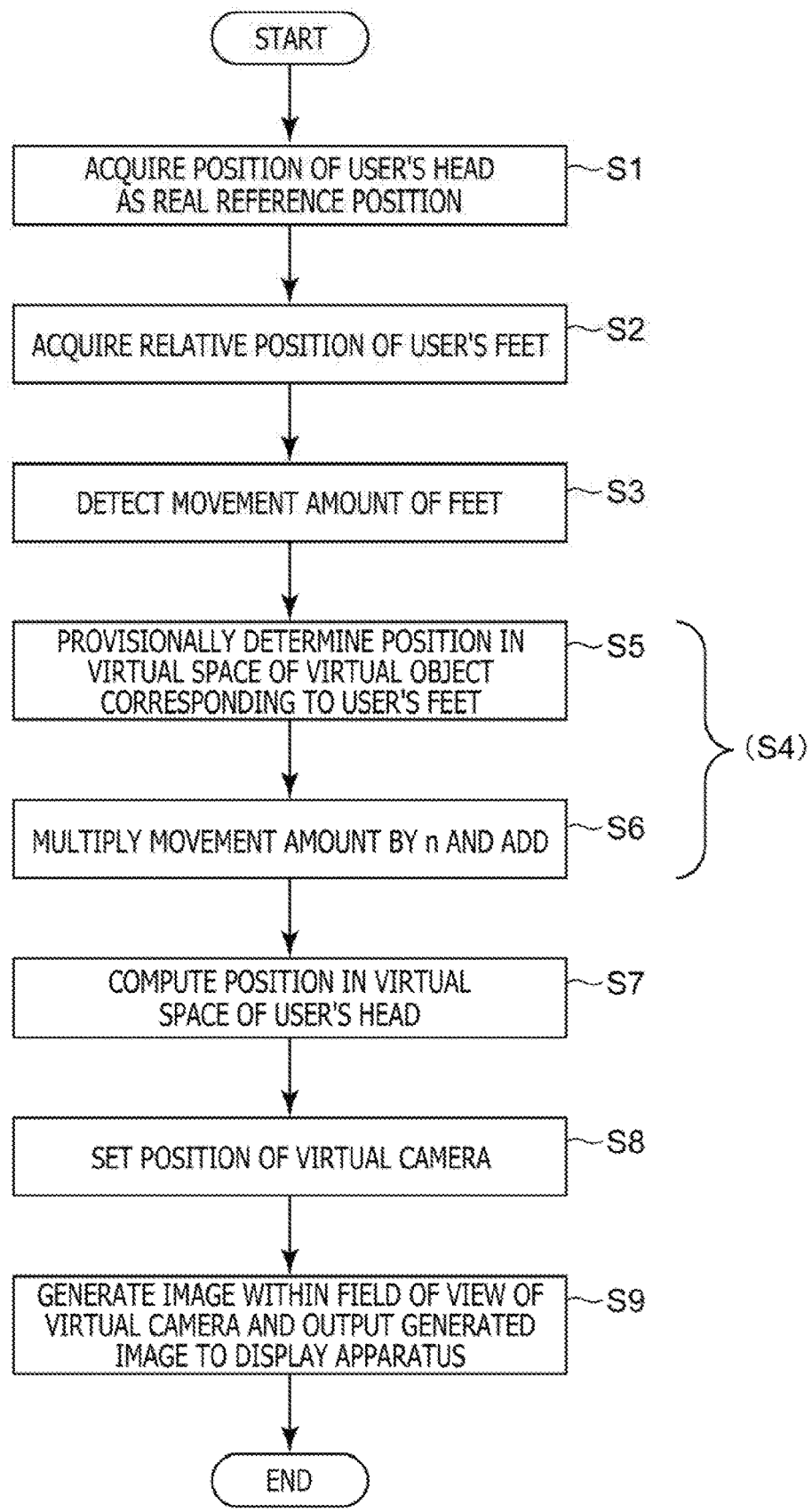
FIG. 4 is a flowchart illustrating exemplary operations of the information processing apparatus according to the embodiment of the present invention.

More specifically, when the information processing apparatus 1 accepts a setting for falling at a fixed velocity, the information processing apparatus 1 concludes in step S4 illustrated in FIG. 4, which is repeatedly executed at predetermined time intervals, that the user's body is rising in the real space as far as the difference between the real reference position information P and the real reference position information Pp acquired upon the previous execution is greater than 0 (P–Pp>0), and then executes the same process as that described earlier.

Further, if the difference between the real reference position information P and the real reference position information Pp acquired upon the previous execution is 0 or a negative value (P–Pp≤0), or if a flag indicative of falling at a fixed velocity is on, the information processing apparatus 1 concludes that the user's body is falling in the real space. If it is concluded that the user's body is falling in the real space, the information processing apparatus 1 performs step S6 instead of step S4 in FIG. 4 and executes a process described below. That is, the information processing apparatus 1 turns on the flag indicative of falling at a fixed velocity. Then, irrespective of the currently acquired relative position Q' and the real reference position information P, the information processing apparatus 1 sets the position information about a virtual object corresponding to the user's feet ($\xi f(t)$, $\eta f(t)$, $\zeta f(t)$) as indicated below by using the previous position information about a virtual object corresponding to the user's feet ($\xi f(t-1)$, $\eta f(t-1)$, $\zeta f(t-1)$):

$$\xi f(t)=\xi f(t-1),$$

$$\eta f(t)=\eta f(t-1),$$

$$\zeta f(t)=\zeta f(t-1)-\Delta \zeta f,$$

where if $\zeta f(t-1)-\Delta \zeta f < \alpha \cdot zh0$, $\zeta f(t)=\alpha \cdot zh0$, and the flag indicative of falling at a fixed velocity is turned off.

The information processing apparatus 1 regards the above-determined coordinate values ($\xi f(t)$, $\eta f(t)$, $\zeta f(t)$) as the coordinate values of the virtual reference position, and determines position coordinates in the virtual space that correspond to the user's attention part at the real reference position in the real space. More specifically, the information processing apparatus 1 inverts the sign of the relative position of the feet with respect to the real reference position (the information acquired in step S2), then acquires the information about the relative position with respect to the real reference position as viewed from the feet position (values in the world coordinate system within the virtual space) by performing conversion to a virtual space scale, and adds the above acquired information about the relative position to the determined information about the virtual reference position ($\xi f(t)$, $\eta f(t)$, $\zeta f(t)$) to determine the position coordinates in the virtual space that correspond to the user's attention part at the real reference position in the real space.

Next, the information processing apparatus 1 sets the position in the virtual space, which corresponds to the user's attention part at the real reference position in the real space and is determined as described above, as the position of the head of the avatar. The information processing apparatus 1 then renders an image in the virtual space within the predetermined field of view forward of the user's head from the position set as described above (the position of the user's head in the virtual space), and transmits the rendered image data to the display apparatus 2 worn by the user.

Consequently, when the user jumps, the information processing apparatus 1 turns on the flag indicative of falling at a fixed velocity at a time point when the movement of the user changes from rising to falling. While the flag indicative of falling at a fixed velocity is on, the information processing apparatus 1 draws an image indicating a situation where the user falls at a fixed velocity in the virtual space (at $\Delta\zeta f$ at repeated time intervals in the above-described example), and presents the drawn image to the user. Further, when the position of the user's head in the virtual space falls below the previous head position, the information processing apparatus 1 turns off the flag indicative of falling at a fixed velocity, aborts the current process, and reverts to the previous process.

Furthermore, when the information processing apparatus 1 accepts a setting according to actual gravitational acceleration or falling at a specified acceleration (including a case where a terminal velocity is reached due, for instance, to encountered air resistance), the information processing apparatus 1 changes the fall velocity $\Delta\zeta f$ for each repetition of the process in the above-described example. More specifically, when the process is repeated at time intervals of $\Delta\tau$, the current fall velocity $\Delta\zeta f(t)$ should be set to $\Delta\zeta f(t)=\Delta\zeta f(t-1)+g\cdot\Delta\tau$ where the specified acceleration is g and the previous fall velocity is $\Delta\zeta f(t-1)$. Meanwhile, when there is a terminal velocity, the terminal velocity should be set again to $\Delta\zeta f(t)$ when the terminal velocity is exceeded by $\Delta\zeta f(t)$ that is obtained by the above calculation.

Moreover, when the information processing apparatus 1 accepts a setting for not allowing the user's body to fall (for producing staging effects to create a situation where the user significantly jumps onto something), the information processing apparatus 1 concludes in step S4 illustrated in FIG. 4, which is repeatedly executed at predetermined time intervals, that the user's body is rising in the real space as far as the difference between the real reference position information P and the real reference position information Pp acquired upon the previous execution is greater than 0 (P−Pp>0), and then executes the same process as that described earlier.

Meanwhile, if the difference between the real reference position information P and the real reference position information Pp acquired upon the previous execution is a negative value (P−Pp<0), the information processing apparatus 1 stores height information $\zeta f(t)$ about the position of a virtual object corresponding to the user's feet as a virtual floor plane position for the user.

Subsequently, in a process described below, $\zeta$-axis coordinates of the position of the user in the virtual space that correspond to the virtual floor plane position for the user are subjected to translation in the positive direction of the $\zeta$-axis.

The process described below presents a video depicting a situation where the user seems to have jumped to a higher place.

[Amount of Movement in XY Plane] Further, the foregoing description assumes that the user's feet serve as a target point on the predetermined target in the real space that corresponds to the reference position in the virtual space, and that the information processing apparatus 1 regards the height of the feet from the floor plane as the amount of movement of the user's feet. However, the present embodiment is not limited to such a case.

For example, the predetermined target moving together with the user may be a playing cart (vehicle) on which the user rides. In this case, the target point may be the leading end of the playing cart or the center of gravity of the playing cart.

In this example, the information processing apparatus 1 acquires information about the position and posture of a predetermined user's attention part in the real space by using a well-known technique such as odometry or SLAM. Further, the information processing apparatus 1 acquires, as the real reference position information, information about a position in the real space of the playing cart on which the user is riding. This position information may be acquired, for example, by using a position detecting sensor (global positioning system (GPS) attached to the playing cart or other sensors detecting a signal from a position information transmitting tag attached to the surface of a road on which the playing cart travels), and wirelessly transmitted from the playing cart to the information processing apparatus 1.

The information processing apparatus 1 uses the acquired real reference position information to compute relative position coordinates with respect to the real space reference position of a point (target point) on the predetermined target moving together with the user. Here, as described in the preceding example, the information processing apparatus 1 determines and stores the relative position Q' (xc−xh, yc−yh, zc−zh) between the coordinates P (xh, yh, zh) of the user's head in the real space, which are indicated by the real reference position information, and the information Q (xc, yc, zc) about the position of the target point on the play cart.

Next, based on the above acquired or determined information, the information processing apparatus 1 determines the amount of movement of the target point on the playing cart from a predetermined initial position. By way of example, it is assumed that the initial position is indicated by the position coordinates (xcp, ycp, zcp) of the playing cart, which have been previously acquired by the information processing apparatus 1, and that the amount of movement is the vector $\Delta Q$ (xc−xcp, yc−ycp, zc−zcp) of the difference between the position coordinates (xcp, ycp, zcp) and the above-acquired position Q (xc, yc, zc).

In this example, based on the above pieces of information, the information processing apparatus 1 computes the reference position of the user in the virtual space. In the present example of the present embodiment, the information processing apparatus 1 stores a previous reference position Qvp ($\xi cp$, $\eta cp$, $\zeta cp$) of the user in the virtual space in advance. The information processing apparatus 1 then adds the previous reference position Qvp of the user in the virtual space to a value that is obtained by multiplying the vector $\Delta Q$ of the difference indicative of the movement amount by a predetermined coefficient (n). That is, information Qv ($\xi c$, $\eta c$, $\zeta c$) about a virtual object position corresponding to the target point on the playing cart is as indicated below:

$$\xi c=\xi cp+n\cdot(xc-xcp)$$

$$\eta c=\eta cp+n\cdot(yc-ycp)$$

$$\zeta c=\zeta cp+\alpha\cdot(zc-zcp)$$

Coordinate values indicated by the position information computed here are then regarded as the coordinate values of the virtual reference position and stored (the position ($\xi c$, $\eta c$, $\zeta c$) computed here is used in the next process as the previous reference position Qvp ($\xi cp$, $\eta cp$, $\zeta cp$) of the user in the virtual space).

The present embodiment assumes that the movement in a direction parallel to the floor plane is multiplied by n and that the movement in the height direction is multiplied by $\alpha$. In the present case, however, $\alpha$ may be equal to n.

Further, the initial position of the reference position of the user in the virtual space (a position in a case where the previous reference position Qvp of the user in the virtual space does not exist) may be determined as indicated below by using the initial position coordinates Q (xc0, yc0, zc0) in the real space of the target point on the playing cart and the coefficient n for the movement amount:

$$\xi c = n \cdot xc0$$

$$\eta c = n \cdot yc0$$

$$\zeta c = \alpha \cdot zc0$$

Furthermore, even in the above example, the position coordinates of the user's head in the virtual space (e.g., a part of the user that is at the real reference position in the real space) are determined by inverting the sign of the information about the relative position Q' (i.e., using the information as the relative position coordinates of the user's head with reference to the target point on the playing cart) and adding the resulting information to the virtual reference position determined here. That is, here, the determination of the position coordinates of the user's head in the virtual space (e.g., a part of the user that is at the real reference position in the real space) is made as indicated below:

$$\xi h = \xi c - xc + xh$$

$$\eta h = \eta c - yc + yh$$

$$\zeta h = \zeta c - zc + zh$$

Further, the information processing apparatus 1 computes the position information of each part of the user in the virtual space by using the relative position (the relative position in the real space) with respect to the position information about the user's head in the virtual space. The information processing apparatus 1 then disposes a virtual object corresponding to the playing cart in the real space at the coordinates of the virtual reference position that are computed here. Additionally, the information processing apparatus 1 disposes a virtual object corresponding to each part of the avatar of the user at a position of each part in the virtual space that is computed here.

Furthermore, the information processing apparatus 1 performs setup so as to dispose each of the virtual objects, which are to be disposed in the virtual space, at a position determined by a predetermined method (the position may be predetermined or may be determined by computation). The objects may include those corresponding to the floor plane. In such a case, the information processing apparatus 1 performs setup such that a virtual object representative of the floor plane is additionally disposed as a virtual floor plane indicative of a position (the plane expressed by $\zeta = zf0$) corresponding to the floor plane in the virtual space.

The information processing apparatus 1 then renders an image in the field of view of the virtual camera disposed at a position corresponding to the user's head, and presents the rendered image to the user.

According to the present example, when the user in the playing cart moves by operating the playing cart, an image depicting the virtual space is presented to the user in such a manner as if the amount of such movement is multiplied by n.

Further, when, in the present example, a virtual object corresponding to an object in the real space (a real object) is to be disposed in the virtual space, a position (xr, yr, zr) in the virtual space that corresponds to a position in the real space at which the real object is disposed is as indicated below, as is the case with the position, for example, of the playing cart, and is at least multiplied by n in the plane (multiplied by the same ratio as or a ratio greater than the movement amount in each axial direction):

$$\xi c = n \cdot xr$$

$$\eta c = n \cdot yr$$

$$\zeta c = \alpha \cdot zr$$

Accordingly, a case in which the distance, for example, to a wall in the real space is multiplied by n and the movement amount is multiplied by n, a failure (in which displayed video indicates an imminent crash against a wall) from being caused by the wall disposed at a position corresponding to the real space (in a case where the movement amount is not multiplied by n) is eliminated.

[Space for Mobility] If, in the present embodiment, the range of mobility is limited due, for instance, to a wall disposed at the periphery of the range of user mobility in the real space, the ratio n of the movement amount in the virtual space to the movement amount in the real space may be varied in accordance with the position of the user in the real space and with the distance to the periphery of the range of mobility. By way of example, when the distance between the above user's position and the periphery of the range of mobility is smaller than a predetermined threshold value (this threshold value represents, for example, a user-reachable distance), the above ratio n is set to "1." In a case in which, for example, n is set to a value smaller than 1 within the range where a user's hand does not reach a wall at the periphery of a space for mobility and the movement amount of the user in the real space is greater than the movement amount of the user in the virtual space, the above process makes it possible to present the same feeling of distance to the wall (at a position where the movement is limited in the virtual space) as in the real place by setting n to "1" at a position close to the wall.

[Acquisition of Information about Position in Real Space] Further, the present embodiment assumes that the information about the position of the user's head in the real space is acquired by odometry or SLAM using an image captured by the imaging section attached to the user's head. However, the present embodiment is not limited to such position information acquisition.

For example, a camera for imaging the range of user mobility may be disposed in the real space to estimate the position and the posture of the user in accordance with an image captured by the camera. More specifically, markers or other devices may be attached to various parts of the user's body, such as a head, shoulders, wrists, and ankles. In the present example, an image of the user is captured by the camera disposed in the real space to detect the positions of the markers attached to the user in the real space and acquire the information about the position and the posture of the user in the real space. A process for acquiring the information about the position and the posture of the user in accordance with the markers as described above is not described in detail here because it is well known. Further, the position of the user may be estimated by measuring the movement amount of each part of the user's body from an initial position through the use of a gyro sensor or other device attached to each part of the user's body.

[Multiple Users] The foregoing description assumes a case where there is only one user. However, the present embodiment is not limited to such a case. The information processing apparatus 1 may perform the process illustrated in FIG. 4 on each of multiple users. That is, the information processing apparatus 1 acquires the information about the position of each user's head in the real space, acquires the information about the relative position of each user's feet with respect to the position of each user's head, and detects the movement amount of each user to determine the virtual reference position in the virtual space that corresponds to each user and determine the position of a virtual object corresponding to each part of each user's body. In this instance, the movement amount is multiplied by the predetermined coefficient (n). The coefficient n may be common to all of the users or may be varied from one user to another in accordance, for example, with a predetermined condition of a game or the like, for example.

Further, the information processing apparatus 1 disposes a virtual camera at the position of each user's head, and renders an image in the field of view in the virtual space that corresponds to the orientation of each user's head. The information processing apparatus 1 then acquires image data in the field of view of the virtual camera attached to each user's head, and transmits the acquired image data to the display apparatus 2 worn by the associated user.

[Mobile Object Other than Users] The amount of axial movement of a non-user object (mobile object) moving in the virtual space may be multiplied by the same coefficient (n) as for the amount of user's axial movement at which the movement amount of the user is multiplied by a predetermined coefficient (n).

When the above scheme is used, for example, in a game about avoiding bullets, users can feel that they move at a velocity n times higher than that of movement in the real space to avoid bullets flying at a velocity n times higher than those that are felt in the real space.

[Change of Body Size in Virtual Space] In the foregoing examples, the position coordinates in the virtual space that correspond to a user's attention part at the real reference position in the real space is determined by using the coordinate values determined in step S6 of FIG. 4 as the coordinate values of the virtual reference position (step S7). That is, the information processing apparatus 1 inverts the sign of the relative position of the feet with respect to the real reference position (the information obtained in step S2 of FIG. 4), acquires the information about the relative position with respect to the real reference position as viewed from the feet position (values in the world coordinate system within the virtual space) in advance by further performing conversion to a virtual space scale, and adds the above acquired information about the relative position to the information about the virtual reference position, which is obtained in step S6 of FIG. 4, to determine the position coordinates in the virtual space that correspond to the user's attention part at the real reference position in the real space.

As an alternative to the above computation, in determining the position coordinates in the virtual space that correspond to the user's attention part at the real reference position in the real space, another example of the present embodiment may invert the sign of the relative position of the feet with respect to the real reference position (the information obtained in step S2 of FIG. 4), multiply the resulting relative position of the feet by a predetermined ratio r, perform conversion to a virtual space scale to acquire the information about the relative position with respect to the real reference position as viewed from the feet position (acquire the values in the world coordinate system within the virtual space), and add the above acquired information about the relative position to the information about the virtual reference position, which is obtained in step S6 of FIG. 4, thereby determining the position coordinates in the virtual space that correspond to the user's attention part at the real reference position in the real space.

The above alternative draws an image in a state where the user's body is enlarged or reduced by the above ratio r in the virtual space, and presents the drawn image to the user.

[User] The foregoing examples assume that the amount of movement in the virtual space is determined based on the amount of movement of a target moving together with the user (the target may be a part of the user's body). However, the present embodiment is not limited to such determination of the amount of movement in the virtual space. For example, the information processing apparatus 1 may determine the amount of movement of a virtual object in the virtual space that corresponds to an object not moving together with the user, such as a drone or other object moving in the real space, by multiplying the amount of movement in a predetermined axial direction of the object moving in the real space by a predetermined coefficient, move the virtual object by the determined amount of movement, and present to the user an image depicting a state where the virtual object is moved.

REFERENCE SIGNS LIST

1 Information processing apparatus, 2 Display apparatus, 11 Control section, 12 Storage section, 13 Operation reception section, 14 Communication section, 21 Control section, 22 Communication section, 23 Imaging section, 24 Display section, 31 Real reference position acquisition section, 32 Relative position acquisition section, 33 Movement amount detection section, 34 Virtual reference position computation section, 35 Virtual relative position computation section, 36 Virtual object arrangement processing section, 37 Rendering processing section, 38 Output section.

The invention claimed is:
1. An information processing apparatus comprising:
detection unit operating to detect an amount of movement in a real space of a target point concerning a predetermined target in the real space; and
setup unit operating to set information about a virtual space by computing a position in the virtual space of a virtual object corresponding to the predetermined target through use of information about the detected amount of movement of the target point, disposing the virtual object at the computed position in the virtual space, and setting the information about the virtual space,
wherein
the information about the virtual space is used to perform a process of displaying an object in the virtual space to a user;
the predetermined target is a target moving together with the user in the real space, the predetermined target being a foot of the user;
the setup unit computes the position in the virtual space of the virtual object corresponding to the predetermined target by using a value obtained by multiplying the detected amount of movement by a predetermined coefficient; and the setup unit uses the information about the detected amount of movement of the target point to compute a position in the virtual space of a virtual object corresponding to the user and the position in the virtual space of the virtual object corresponding to the predetermined target, disposes the virtual objects in the computed positions in the virtual space, and sets the information about the virtual space.

2. The information processing apparatus according to claim 1, wherein the predetermined target moving together with the user is a part of a user's body.

3. The information processing apparatus according to claim 1, further comprising:
first acquisition unit operating to acquire information about a position of a predetermined user's attention part in the real space; and
second acquisition unit operating to regard the position acquired by the first acquisition unit as a real space reference position, and acquiring the relative position coordinates of the target point set on the predetermined target moving together with the user, the acquired relative position coordinates being with respect to the real space reference position,
wherein the setup unit sets the information about the virtual space computes the position in the virtual space of the virtual object corresponding to the user and the position in the virtual space of the virtual object corresponding to the predetermined target by using the information about the position of the user that is acquired by the first acquisition means, the relative position coordinates acquired by the second acquisition means, and the information about the detected amount of movement of the target point.

4. The information processing apparatus according to claim 3, wherein the first acquisition unit detects a position of a device worn by the user in the real space and acquires information about a position of the user in the real space.

5. The information processing apparatus according to claim 3, wherein the first acquisition unit further acquires information about a posture of the user, and the setup unit sets an aspect of a virtual object corresponding to the user in accordance with the acquired information about the posture of the user.

6. The information processing apparatus according to claim 1, further comprising:
an acquiring unit operating to acquire information indicative of a position of a real object in the real space,
wherein the setup unit performs a process of disposing a virtual object corresponding to the real object in the virtual space, and computes virtual space coordinates corresponding to the position of the real object in the real space by using a predetermined coefficient regarding the amount of movement.

7. An information processing method that is performed by using a computer, the method comprising:
detecting an amount of movement in a real space of a target point concerning a predetermined target in the real space; and
setting information about a virtual space by computing a position in the virtual space of a virtual object corresponding to the predetermined target through use of information about the detected amount of movement of the target point, disposing the virtual object at the computed position in the virtual space, and setting the information about the virtual space, wherein
the information about the virtual space is used to perform a process of displaying an object in the virtual space to a user;
the predetermined target is a target moving together with the user in the real space, the predetermined target being a foot of the user;
the setup unit computes the position in the virtual space of the virtual object corresponding to the predetermined target by using a value obtained by multiplying the detected amount of movement by a predetermined coefficient; and
the setting includes using the information about the detected amount of movement of the target point to compute a position in the virtual space of a virtual object corresponding to the user and the position in the virtual space of the virtual object corresponding to the predetermined target, disposing the virtual objects in the computed positions in the virtual space, and setting the information about the virtual space.

8. A non-transitory, computer readable storage medium containing a computer program, which when executed by a computer, causes the computer to carry out actions, comprising:
detecting an amount of movement in a real space of a target point concerning a predetermined target in the real space;
setting information about a virtual space by computing a position in the virtual space of a virtual object corresponding to the predetermined target through use of information about the detected amount of movement of the target point, disposing the virtual object at the computed position in the virtual space, and setting the information about the virtual space; and
outputting information about the virtual space;
wherein
the predetermined target is a target moving together with the user in the real space, the predetermined target being a foot of the user;
the setting includes computing the position in the virtual space of the virtual object corresponding to the predetermined target by using a value obtained by multiplying the detected amount of movement by a predetermined coefficient; and
the setting includes using the information about the detected amount of movement of the target point to compute a position in the virtual space of a virtual object corresponding to the user and the position in the virtual space of the virtual object corresponding to the predetermined target, disposing the virtual objects in the computed positions in the virtual space, and setting the information about the virtual space.

9. The information processing apparatus according to claim 1, wherein
for a plurality of users, each associated with a respective target point concerning a respective predetermined target, and a respective virtual object,
the detection unit detects, respectively for each of the plurality of users, a respective amount of movement relative to the user in the real space of the respective target point concerning the respective predetermined target in the real space, the respective predetermined target moving together with the user in the real space;
the setup unit sets the information about the virtual space by, respectively as to each predetermined target, computing a respective position in the virtual space of the respective virtual object corresponding to the respective predetermined target by using a respective value obtained by multiplying the detected respective amount of movement by a respective predetermined coefficient, disposing the respective virtual object at the computed respective position in the virtual space, and setting the information about the virtual space, the information about the virtual space is used to perform the process of displaying the object in the virtual space to the plurality of users, and the respective predetermined coefficient is different for each user, in accordance with a predetermined condition of a game.

* * * * *